United States Patent [19]

Fenton et al.

[11] Patent Number: 4,539,374

[45] Date of Patent: Sep. 3, 1985

[54] POLYOLEFIN WITH IMPROVED PROCESSING PROPERTIES

[75] Inventors: Jeff T. Fenton, Stillwater; Allan J. Lundeen, Ponca City; Mark P. Mack, Ponca City; Jean A. Merrick, Ponca City, all of Okla.

[73] Assignee: E. I. Du Pont de Nemours and Company, Ponca City, Okla.

[21] Appl. No.: 591,725

[22] Filed: Mar. 21, 1984

[51] Int. Cl.$^3$ .................... C08L 23/04; C08L 23/20; C08L 23/24
[52] U.S. Cl. .................................................. 525/240
[58] Field of Search ........................................ 525/240

[56] References Cited

U.S. PATENT DOCUMENTS 3,374,290  3/1968  Franke et al. .................. 525/240

FOREIGN PATENT DOCUMENTS 425871  9/1962  Japan .

Primary Examiner—Carman J. Seccuro
Attorney, Agent, or Firm—Cortlan R. Schupbach

[57] ABSTRACT

Processing properties of polyethylene resins are improved while retaining original physical properties by incorporating less than 1.5 weight percent of high molecular weight, non-crystalline polyolefins into the polyolefin resins. The resulting compositions exhibit reduced melt viscosity at high shear rates while providing essentially unchanged finished physical properties of the polyethylene article.

9 Claims, 1 Drawing Figure

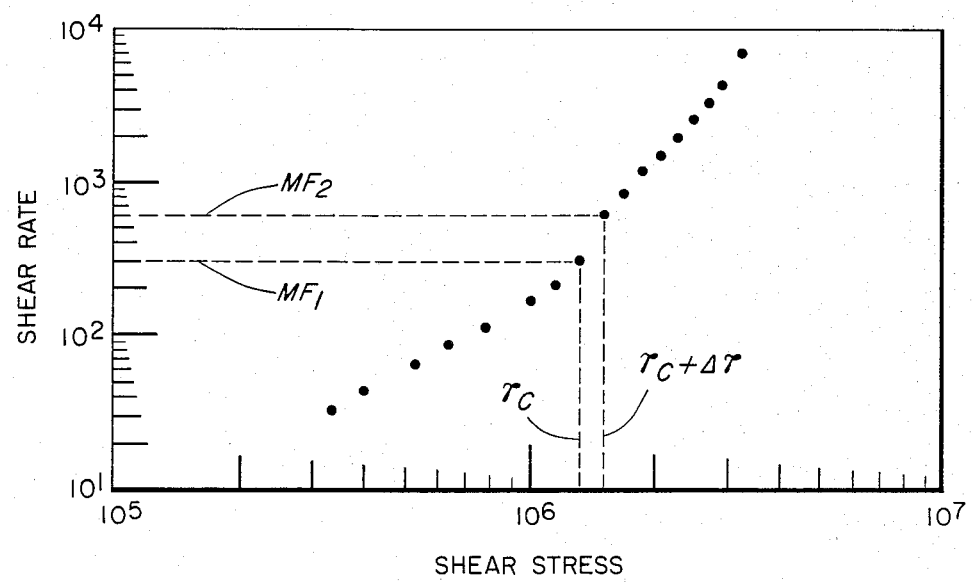

POLYOLEFIN WITH IMPROVED PROCESSING PROPERTIES

This invention relates to a method of improving polyethylene processing characteristics while retaining original polyethylene resin characteristics. More specifically, this invention relates to improving polyethylene processing characteristics by incorporating high molecular weight non-crystalline materials into the polyethylene to form new compositions which process easily at high shear rates while retaining essentially the same polyethylene properties.

Polyethylene is a known material of considerable commercial importance throughout the world. Polyethylene was originally produced utilizing high pressure techniques, providing a low density material having a density of from about 0.91 to about 0.93 grams per cubic centimeter. More recently, solution and slurry polymerization processes have been developed utilizing low pressures and catalysts which provide high density polyethylene having densities of from about 0.94 to about 0.99 grams per cubic centimeter. These high density polyethylenes have many valuable properties when formed into useful articles, but have disadvantages such as low processing rates and processing problems such as "shark skin", or rough surfaces on finished articles.

Much art exists on the methods of altering the final physical properties of such polyethylenes.

Representative but non-exhaustive examples of such art include U.S. Pat. Nos. 3,374,290 and 3,821,332. Other references include Canadian Pat. No. 626,733, Great Britain Pat. No. 893,540, and Offenlegungsschrift No. 2034022. However, these references all deal with altering the ultimate physical properties of the finished articles. In particular, U.S. Pat. No. 3,374,290 utilizes from 2 to 20 weight percent of linear alpha olefin polymers, in which each alternate carbon atom in the linear chain is a side chain containing between 6 and 14 carbon atoms.

In an effort to improve processing without changing physical properties of the original polymer, Canadian Pat. No. 691,125 blends the ethylene polymer with up to about 10% by weight of isobutylene, styrene and methyl styrene at a critical temperature of 300° C. to 400° C. to partially depolymerize the material.

However, these methods do not satisfactorily provide a method of obtaining a polyethylene composition with a proper mix of properties in the finished product, yet are fast and easily processed. Much work is directed toward obtaining these goals by catalyst modification, additive addition to the resin during processing and reaction of the resin with other compounds during pelletization or other processing. Included in such processes currently in the art are the addition of viscosity depressants such as ethoxylated fatty acids, which function as wetting agents, or dispersing aids for resin/plasticizer combinations. However, these methods are likely to substantially affect the finished properties of the polyethylene resin and in addition require much blending during processing.

It would therefore be of great benefit to provide a method whereby high density polyethylene resins can be easily processed, yet provide finished articles having essentially unchanged properties from the original resin.

It is therefore an object of the present invention to provide a method for improving the processing of high density polyethylene resins, and a novel polyethylene composition. Other objects will become apparent to those skilled in this art as the description proceeds.

We have now discovered that a novel composition having unique processing properties can be obtained by blending low levels of ultra-high molecular weight non-crystalline hydrocarbon soluble poly (alpha olefins) with substantially crystalline, high density polyethylene polymers and copolymers. When blended with high density polyethylene at levels of less than 1.5% by weight, the ultra-high molecular weight non-crystalline hydrocarbon soluble polymers provide a surprising decrease in viscosity at high shear rate, leading to less surface distortion of injected and blow molded articles, yet provide a composition which compounds and behaves substantially similarly to unmodified polyethylene polymers and copolymers and is homogenous in nature.

It has been surprisingly discovered that levels of less than 1.5% by weight of these high molecular weight non-crystalline polymers intimately incorporated into polyethylene polymers and copolymers provide no detectable physical property change until the application of elevated shear rates. Upon application of elevated shear rates, these materials decrease in viscosity for the period of the elevated shear, providing much improved processing characteristics, yet provide a finished product having essentially the same properties as non-modified polyethylene resins when processed in the same fashion. Thus the present invention provides a method for improving the processing characteristics of extrudable, substantially crystalline polyolefin polymers and copolymers having a density of at least about 0.90 grams per cubic centimeter, when prepared from monomers containing from 2 to about 10 carbon atoms, comprising incorporating into said polymer or copolymer up to 1.5% by weight of substantially non-crystalline polymers or copolymers formed from monomers containing from 2 to 30 carbon atoms, preferably from 2 to 12 carbon atoms, said incorporated polymer or copolymer having an inherent viscosity of at least 6.0 deciliters per gram measured at a shear rate of 300 sec$^{-1}$ in a hydrocarbon solvent at 25° C.

The method of the present invention is preferably utilized in extrusion, injection, or blow molding of crystalline polyolefin polymers and copolymers, since the effect of the present invention is most dramatically seen in these polymers. These extrudable polyolefins must contain by weight a major portion of polyethylene, polypropylene, poly(butene-1) or mixtures of these.

When the melt index of the substantially crystalline polyolefin polymers is greater than 1.0, the ratio of $MV_2$ to $MV_1$ ranges from about 0.95 to 0.25, wherein $MV_1$ is the melt viscosity of the crystalline polymer at 190° C. and at a shear rate of 2000 sec$^{-1}$ and $MV_2$ is the melt viscosity of the composition after incorporation of the non-crystalline polymer at 190° C. and at a shear rate of 2000 sec$^{-1}$.

When the melt index of the substantially crystalline polyolefin is less than or equal to 1.0, then the ratio of $MV_2$ to $MV_1$ ranges from 0.95 to 0.25, wherein $MV_1$ is the melt viscosity of the crystalline polymer before incorporation of the non-crystalline polymer, and $MV_2$ is the melt viscosity of the composition after incorporation of the non-crystalline polymer, both measured at a shear rate of 200 sec$^{-1}$ at 190° C.

Any extrudable polyolefin containing a major portion of polyethylene, polypropylene, poly(butene-1) or mixtures of these is suitable for use in the composition and method of the present invention. For example, both high and low density polyethylenes or mixtures of these can be employed. Further, the procedure by which these polyolefins are prepared is not relevant to the present invention, since the present invention does not alter the ultimate physical properties of finished articles prepared from these polyolefins. Of these polyolefins, those containing a major amount of polyethylene or, in particular, polyethylene homopolymers or copolymers containing at least 80 percent by weight polyethylene polymers and copolymers are most preferred. Particularly preferred are polyethylene polymers and copolymers prepared using solution polymerization techniques.

The instant invention is further characterized in the determination of the melt fracture region by a ratio of treated to untreated material, wherein the ratio $$\frac{(\log_{10} MF_2 - \log_{10} MF_1)_t}{(\log_{10} MF_2 - \log_{10} MF_1)_u}$$

is less than 0.95, wherein $MF_1$ is the shear rate at onset of melt fracture, $MF_2$ is the shear rate at the end of the melt fracture region, t refers to the blends and compositions of the present invention, and u refers to the substantially crystalline polymer or copolymer prior to the addition of the ultra-high molecular weight substantially non-crystalline materials.

The compositions of the present invention can be prepared by dissolving the ultra-high molecular weight non-crystalline material and the polyolefin resin in a common solvent, combining the solution and then removing the solvent or precipitating the blend by addition of a non-solvent. All traces of solvent are removed and the material is thereafter treated as a normal polyolefin resin.

Although any mutual solvent can be used, it is preferred that solvents with as high a boiling point as possible be used since the polymers may require heating for dissolution. When materials such as polyethylene are prepared in a solution process, the dissolved non-crystalline high molecular weight polymer can simply be added to the reaction mixture after polymerization and before polymer recovery to contain the compositions of the present invention which contain substantially improved processing properties.

However, the present invention is applicable to all polyolefin polymers which can be dissolved in solvents at temperatures of from about 110° to about 300° C. These materials are then contacted with a solution containing the ultra-high molecular weight non-crystalline material and an intimately blended polymer is recovered, either by solvent removal or by precipitation with a second solvent.

Representative but non-exhaustive examples of mutual solvents for both polyolefin polymers and the ultra-high molecular weight non-crystalline materials useful in the present invention are alkanes, such as butane, decane 2,2-dimethylbutane, 2,3-dimethylbutane, n-docosane, dodecane, ethane, 3-ethylpentane, heptane, hexadecane, hexanes, 2-methylbutane, nonedecane, n-nonane, octadecane, octane, pentane, petroleum ether, propane, n-tridecane, n-undecane, and cyclic, high carbon content alkanes; alkenes such as butene-1, butene-2, butadiene, decene-1, 3,3-dimethyl-1-butene, dipentene, 1-docosene, 1-dodecene, 1-heptene, 1-hexene, 2-hexene, 3-hexene, isoprene, 1-nonene, 1,7-octadiene, 1-octene, styrene, 1-tridecene, and vinylcyclohexane; and condensed nuclear hydrocarbons such as anthracene and naphthalene; and other hydrocarbons such as adamantane, benzene, biphenyl, cycloheptane, cyclohexane, cyclohexene, cyclooctane, cyclopentane, diethylbenzene, p-terphenyl, toluene, o-xylene, m-xylene, p-xylene and kerosene.

Representative but non-exhaustive examples of precipitating solvents useful in practicing the present invention arealiphatic and alicyclic hydroxy compounds such as methyl alcohol, ethyl alcohol, n-propyl alcohol, n-butyl alcohol, n-pentyl alcohol, n-hexyl alcohol, n-heptyl alcohol, n-octyl alcohol, n-decyl alcohol, isopropyl alcohol, isobutyl alcohol and sec-butyl alcohol; cyclic alcohols such as cyclopentanol, cyclohexanol, benzyl alcohol; naphthols; phenols; alkyl ketones such as acetones, methyl ethyl ketone, methyl n-propyl ketone, ethyl ketone and methyl isopropyl ketone; aryl ketones such as benzophenone; aralkyl ketones such as acetophenol and n-butyrophenol; and carbocyclic ketones such as cyclodecanone, cycloheptanol, cyclohexanone, cyclooctanone, and cyclopentanone.

The ultra-high molecular weight non-crystalline material described in the present invention are those commonly used to reduce drag in conduits containing flowing hydrocarbons and are commercially available as CDR Flow Improver (CDR is a registered trademark of and is sold by Conoco Inc.) These materials can be prepared by processes such as described in U.S. Pat. No. 4,358,572 and U.S. Pat. No. 4,433,123.

Thus the present invention provides a resin composition comprising from about 98.5% to about 99.9% by weight of an extrudable, substantially crystalline polyolefin polymer or copolymer formed from olefins containing from 2 to 12 carbon atoms and from about 0.1% to about 1.5% by weight of a substantially non-crystalline, hydrocarbon soluble polyolefin polymer or copolymer having an inherent viscosity of at least 6.0 deciliters per gram at 300 $sec^{-1}$, which is formed from monomers containing from 2 to 30 carbon atoms.

Specific amorphous copolymers useful in the preparation of the high molecular weight non-crystalline material blended with a crystalline polyolefin includes poly(octene-1), poly(decene-1), and poly(dodecene-1), as well as the $C_8$, $C_{10}$, and $C_{12}$ copolymers and terpolymers. These materials can contain $C_2$, $C_4$ and $C_6$ copolymers.

The instant invention is especially applicable to crystalline polymers such as high density polyethylene, low density polyethylene, medium density polyethylene, linear low density polyethylene, isotactic polypropylene, isotactic poly(butene-1), isotactic poly(4-methyl-1-pentene), and mixtures of these.

The instant invention is more concretely described with reference below wherein all parts and percentages are by weight unless otherwise specified. The examples are provided to illustrate the present invention and not to limit it.

EXAMPLE 1

A high molecular weight amorphous hydrocarbon soluble polymer having an inherent viscosity of 11.5±0.3 (Conoco CDR ® 132 Flow Improver, trademark of and sold by Conoco Inc.) in the amount of 3.0 grams was added to a beaker containing approximately 300 milliliters of low polynuclear aromatic solvent (LPA). The solvent was modified by the addition of 1 gram each butylated hydroxytoluene (BHT) antioxidant, and Irganox 1076 antioxidant (trademark of and sold by Ciba-Geigy Corp.) in 3500 ml of low polynuclear aromatic solvent. The mixture was heated to a temperature of from 110° C. to 120° C. and stirred gently until dissolution. Following dissolution, 10 grams of high density polyethylene pellets were added and the mixture stirred at a temperature of from 120° C. to 130° C. until solution was completed. The solution obtained was then poured into approximately 750 ml of vigorously stirred isopropanol to precipitate the polymer composition. After precipitation, the composition was filtered and dried in a vacuum oven. After drying, the composition was once again contacted with isopropanol in a blender and blended until the material was powdery. The procedure further removed residual traces of low polynuclear aromatic solvent. Physical properties of the blend and of the untreated high density polyethylene starting material are set forth in Table 1, wherein SROF is shear rate of fracture as determined by capillary rheometry, generally using the procedure described in J. Appl. Polym. Sci. 1983 28(9), 2777–91, Bersted, B. H., entitled *Investigation Of The Oscillating Flow Phenomenon In High Density Polyethylene.*

TABLE 1

|  | PE alone | Polymer Blend |
|---|---|---|
| MI$_2$ (g/10 min) | 0.38 | 0.42 |
| MI$_{20}$ | 25 | 29 |
| MI$_{20}$/MI$_2$ | 66 | 70 |
| Viscosity (poise) @ 20S$^{-1}$ | 4.2 × 10$^4$ | 3.4 × 10$^4$ |
| Viscosity (poise) @ 200S$^{-1}$ | 1.02 × 10$^4$ | 0.92 × 10$^4$ |
| SROF Onset (S$^{-1}$) | 506 | 510 |
| SROF End (S$^{-1}$) | 4100 | 1595 |

EXAMPLE 2

Composites of poly(1-decene) with injection molding high density polyethylene were prepared as described in Example 1.

Using the compositions obtained from various concentrations of poly(1-decene), tests were carried out to show the effects of the addition of the non-crystalline material. Melt flow measurements were obtained using a Sieglaff-McKelvey capillary rheometer fitted with a cylindrical orifice of 0.025 centimeters radius, 2.54 centimeters length, and 180° entrance angle. Measurements were all conducted at 190° C.

The polymer compositions were forced through the orifice by a pneumatic driven plunger. The plunger velocity and the force were continuously monitored by velocity and flow transducers. The apparent viscosity in poise ($\eta$) was calculated by the relationships $$\text{apparent shear stress} = \tau \text{ (dynes/cm}^2\text{)} = \frac{\Delta P \times R}{L}$$

$$\text{apparent shear rate} = \gamma \text{ (sec}^{-1}\text{)} = \frac{4Q}{R^3}$$

$$\text{apparent viscosity} = \eta \text{ (poise)} = \frac{\tau}{\gamma}$$

where $\Delta P$ is the pressure drop across the capillary, R is the capillary radius, L is the capillary length, and Q is the volumetric flow rate through the capillary.

At a shear rate of 200 sec$^{-1}$ or higher, the reproducibility of the apparent viscosity is ±3%. The results are set forth in Table 2.

TABLE 2

Poly (1-Decene) with Injection Molding HDPE

| Poly(1-Decene) Concentration Weight Percent | MI$_2$ (g/10 min) | Apparent Viscosity Poise at 2000 sec$^{-1}$ | Viscosity Ratio BLEND:HDPE | MELT FRACTURE REGION | | |
|---|---|---|---|---|---|---|
| | | | | MF$_1$ (sec$^{-1}$) | MF$_2$ (sec$^{-1}$) | Log$_{10}$MF$_2$ − Log$_{10}$MF$_1$ |
| 0.0 | 4.8 | 2000 | 1.00 | 1670 | 4650 | 0.44 |
| 0.01 | 4.4 | 2100 | 1.05 | 1440 | 4500 | 0.49 |
| 0.1 | 5.1 | 1850 | 0.93 | 1800 | 5840 | 0.51 |
| 0.5 | 6.5 | 1500 | 0.75 | 3095 | 7000 | 0.35 |
| 1.0 | 5.0 | 1150 | 0.58 | 290 | 600 | 0.31 |
| 1.5 | 3.0 | 830 | 0.42 | 210 | 1360 | 0.81 |

The melt fracture region refers to the range of shear rates wherein extruded polymer exhibits gross surface distortion. A resin which exhibits such distortion in the operating range of polymer processing equipment is not suitable for that process. In such a case it is desirable to modify the polymers such that the melt fracture region is shifted outside the range of processing equipment. A desired shift may be to higher or lower shear rates depending upon the process.

The shear rate range over which melt fracture is observed is dependent on die geometry. We have found, however, that relative comparisons between polymers are generally independent of the die geometry.

The melt fracture region was determined using the capillary rheometer, orifice and temperature described for determining melt viscosity. The measurement was conducted by increasing the shear stress in small increments of 5–10% until at some critical shear stress ($\tau_C$) the emerging extrudate showed gross surface distortions. The shear rate at this critical shear stress ($\tau_C$) is referred to as MF$_1$. In certain linear polymers, including high density polyethylene, the appearance of gross surface distortions is accompanied by a discontinuity in the shear rate vs shear stress curve. Between the critical shear stress ($\tau_C$) and ($\tau_C + \Delta\tau$) where $\Delta\tau$ is 5 to 10% of $\tau_C$, the shear rate increases by 100% or greater. The shear rate at $\tau_C + \Delta\tau$ is referred to as MF$_2$. At shear rates lying between MF$_1$ and MF$_2$, the extrudate surface is alternately smooth and grossly distorted. Above the shear rate MF$_2$ the extrudate surface has only fine distortion. The critical parameters defining melt fracture are illustrated in the Figure. The shear rates MF$_1$ and MF$_2$ can be determined within a ±15% range or less.

It is also generally desirable for a resin to exhibit melt fracture over a narrow rather than a broad melt fracture range. A narrow melt fracture range indicates the resin is suitable for more than one type of processing machinery. The breadth of the melt fracture region is defined as log$_{10}$ MF$_2$ − log$_{10}$ MF$_1$.

EXAMPLE 3

Blends of poly(1-decene) with blow molding high density polyethylene were prepared at various levels of poly-1-decene and tests were carried out at described above using the same considerations and parameters. The results are set forth in Table 3.

TABLE 3

| Poly(1-Decene) Concentration Weight Percent | MI$_2$ (g/10 min) | Apparent Viscosity Poise at 200 sec$^{-1}$ | Viscosity Ratio BLEND:HDPE | MELT FRACTURE REGION | | |
|---|---|---|---|---|---|---|
| | | | | MF$_1$ (sec$^{-1}$) | MF$_2$ (sec$^{-1}$) | log$_{10}$MF$_2$ − Log$_{10}$MF$_1$ |
| 0.0 | 0.38 | 10200 | 1.00 | 510 | 4100 | 0.91 |
| 1.0 | 0.42 | 9200 | 0.90 | 510 | 1595 | 0.50 |
| 10.0 | 0.31 | 4300 | 0.42 | 170 | 1080 | 0.80 |

While certain embodiments and details have been shown for the purpose of illustrating this invention, it will be apparent to those skilled in this art that various changes and modifications may be made herein without departing from the spirit or scope of the invention.

We claim:

1. A method for improving the processing characteristics of extrudable, substantially crystalline polyolefin polymers and copolymers prepared from monomers containing from 2 to 10 carbon atoms, comprising incorporating into a said polymer or copolymer up to 1.5% by weight of a substantially non-crystalline hydrocarbon soluble homopolymer of a C$_8$–C$_{30}$ monolefin monomer or copolymer thereof formed with monolefin monomers containing from 2 to 30 carbon atoms, said incorporated homopolymer or copolymer having an inherent viscosity of at least 6.0 deciliters per gram at a shear rate of 300° sec$^{-1}$ at 25° C.

2. A method as described in claim 1 wherein the extrudable polyolefins contained by weight a major portion of polyethylene, polypropylene, poly(butene-1), or mixtures of these prior to incorporation of a non-crystalline polymer.

3. A method as described in claim 2 wherein the crystalline, extrudable polyolefin contains a major portion by weight of polyethylene.

4. A method as described in claim 3 wherein the melt index of the substantially crystalline polymer is greater than 1.0 and the ratio of MV$_2$ to MV$_1$ is 0.95 to 0.25, wherein MV$_1$ is the melt viscosity of the crystalline polymer at 190° C. and a shear rate of 2000 sec$^{-1}$ and MV$_2$ is the melt viscosity of the composition after incorporation of the non-crystalline polymer measured at 190° C. and a shear rate of 2000 sec$^{-1}$.

5. A method as described in claim 3 wherein the melt index of the substantially crystalline polymer is less than 1.0 and the ratio of MV$_2$ to MV$_1$ is from 0.95 to 0.25 wherein MV$_1$ is the melt viscosity of the crystalline polymer and MV$_2$ is the melt viscosity of the composition after incorporation of the non-crystalline polymer both measured at 190° C. and a shear rate of 200 sec$^{-1}$.

6. A method as described in claim 4 wherein the ratio $$\frac{(\log_{10} MF_2 - \log_{10} MF_1)_t}{(\log_{10} MF_2 - \log_{10} MF_1)_u}$$

is less than 0.95 wherein MF$_1$ is the shear rate at onset of melt fracture, MF$_2$ is a shear rate at the end of the melt fracture ragion, t refers to the blend of crystalline and non-crystalline polymers, and u refers to the substantially crystalline polymer or copolymer prior to the addition of the non-crystalline material.

7. A resin compositon comprising from 98.5% to 99.9% by weight of an extrudable, substantially crystalline polyolefin homopolymer or copolymer formed from olefins containing from 2 to 30 carbon atoms, together with from about 0.1% to about 1.5% by weight of a substantially non-crystalline homopolymer of a C$_8$–C$_{30}$ monolefin monomer or copolymer thereof having an inherent viscosity of at least 6.0 deciliters per gram and formed with monolefin monomers containing from 2 to 30 carbon atoms.

8. A resin composition as described in claim 7 wherein the crystalline polyolefin polymer is made up of high density polyethylene, medium density polyethylene, low density polyethylene, linear low density polyethylene, isotactic polypropylene, isotactic polybutene-1, isotactic poly(4-methyl-1-pentene) or mixtures of these.

9. A composition as described in claim 8 wherein the non-crystalline hydrocarbon soluble polymers contains at least one material selected from the group consisting of poly(octene-1), poly(decene-1), poly(dodecene-1) and copolymers and terpolymers of these.

* * * * *